Figure 1:
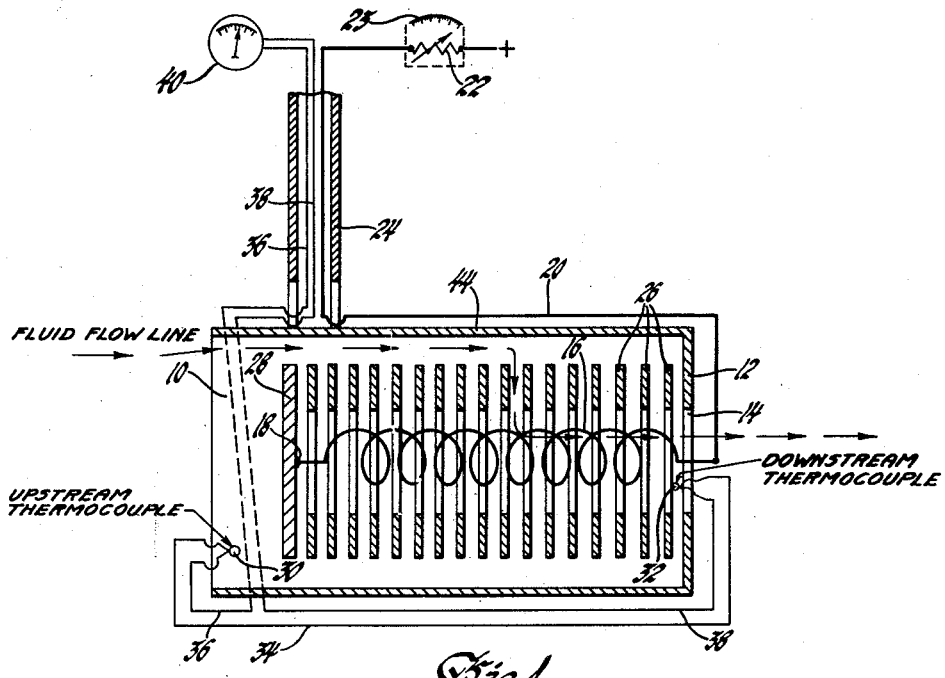

March 26, 1957 — E. J. MARTIN ET AL — 2,786,354

THERMAL TYPE FLOWMETER

Filed Jan. 7, 1950

Inventors
Edward J. Martin &
Joseph F. White

By Willits, Helwig & Baillio
Attorneys

United States Patent Office 2,786,354
Patented Mar. 26, 1957

2,786,354

THERMAL TYPE FLOWMETER

Edward J. Martin, Pleasant Ridge, and Joseph F. White, Berkley, Mich., assignors to General Motors Corporation, Detroit, Mich., a corporation of Delaware Application January 7, 1950, Serial No. 137,326

4 Claims. (Cl. 73—204)

The present invention relates to a thermal type flow meter and a means for measuring the rate of fluid flow.

Thermal type flow meters, in the past, required a large amount of insulation to keep the heat emanating from the heat element within the fluid flow. This, in turn, introduced a thermal mass and consequently a thermal inertia capable of retarding the flow meter response during a change of fluid flow.

It is an object of this invention to obviate excessive insulation and consequently enable construction of a more simple and compact unit.

It is also an object of this invention to eliminate thermal inertia other than that of the heat element and temperature sensitive devices used to record the temperature changes.

It is a further object of the invention to provide means for measuring fluid flow by the opposition of heat flow to fluid flow.

This invention provides a thermal type flow meter and metering device which is dependent only on the constancy of the thermal capacity of the fluid being metered and is independent of the fluid temperature or pressure. The major structural elements necessary to this invention include a heating element of known and controllable power consumption, a temperature sensitive element upstream of the heating element, a similar temperature sensitive element downstream of the heating element, and an appropriate flow directing apparatus to confine thermal energy from the heating element to the fluid stream.

More specifically stated, fluid flow directing apparatus is provided which will direct the fluid flow radially inward, in opposition to the radially outward flow of heat by conduction and convection from the axially centered heating element, thereby confining the heating element energy to the fluid flowing through the flow meter. This avoids the necessity for insulating means, to confine thermal energy to the fluid stream, with a consequent elimination of a thermal mass and a thermal inertia which retarded response to changed flow-rates.

The invention will appear more clearly from the following detailed description when taken in connection with the accompanying drawings, showing by way of example, preferred embodiments of the inventive idea.

Figure 2:
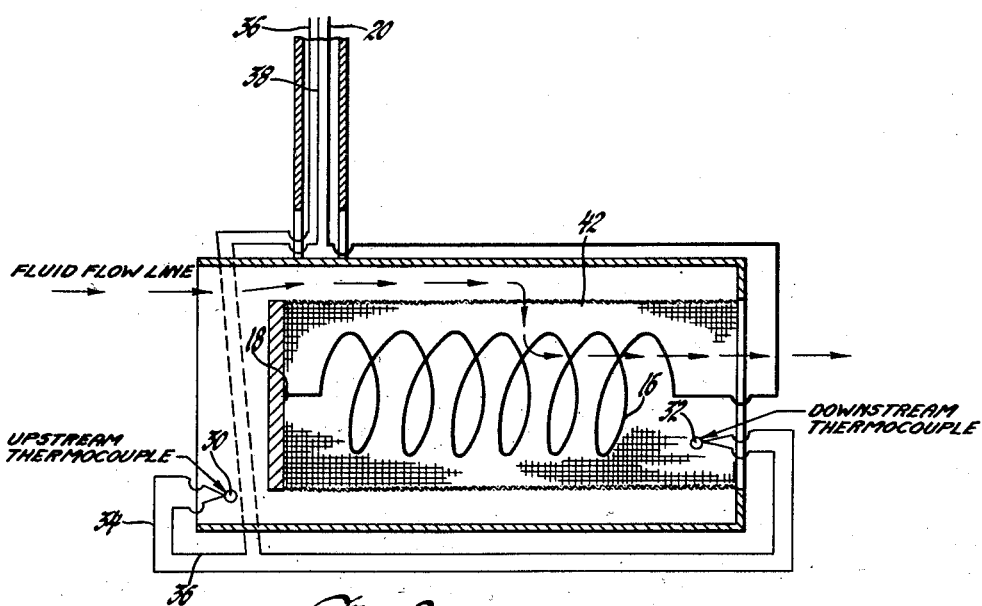

In the drawings:

Figure 1 is a sectional diagrammatic view of one embodiment of the structural features of the invention and Figure 2 is a similar view of a modification including a variation in the form of the flow-directing means.

Referring to Figure 1, the structure shown includes a confined passage 10, which may conveniently be of cylindrical cross-section, with a flange 12 extending radially inward which will cause fluid flow to emerge through an opening 14 at the downstream end of said passage. Secured and centered axially in the passage 10 is an elongated heating element 16 extending rearwardly from its grounded connection 18 to the center of the inwardly extending passage flange 12 where a heater lead conductor 20 connects the heating element 16 to a source of power.

Between the source of power and the heater lead conductor 20 there is connected a variable means for power control such, for example, as a variable resistance 22 having in conjunction with its movable adjustment means a scale or dial 23 to indicate the setting of the variable means and thereby the power consumed.

Honeycombing the heating element 16 are a number of closely spaced circumferential plates 26 conventionally secured axially within the passage 10 and extending rearwardly about the elongated heating element 16. At the upstream limit of these closely spaced plates 26 is a deflecting plate 28, secured in the passage 10, to which the heating element is grounded at 18 and over which the fluid flow is deflected. The downstream limit of the closely spaced circumferential plates 26 is the inwardly extending radial flange 12 of passage 10.

A temperature sensitive element 30, such as for example a thermocouple, is positioned and secured in the fluid flow to the inner wall 44 of the confined passage 10 upstream of deflection plate 28. A second temperature sensitive element 32 is axially positioned and secured in the downstream opening 14 of passage 10. Conductor 34 connects one terminal of the upstream temperature sensitive element 30 to an opposite terminal of the downstream temperature sensitive element 32 thereby causing an opposition of readings giving a differential which conductors 36 and 38, respectively, completing the circuit from the temperature sensitive elements 30 and 32, will indicate on meter 40 via the conduit like protecting member 24.

Figure 2 differs from Figure 1 only in that the circumferential radial plates 26 which deflect fluid flow inward are replaced by a fine mesh wire screen 42 serving the same purpose and placed in the same position as the plates 26 were placed.

In operation the heating element 16 is heated to a determinable degree by means of the heater lead conductor 20. The fluid flowing into the confined passage 10 passes the upstream temperature sensitive element 30, in its normal state, and is deflected outward towards the passage wall 44 by the deflection plate 28. The fluid flow along the inner passage wall 44 is deflected inward, once past the annular deflection plate 28, by either the circumferential plates 26 of Figure 1, the cylindrical fine mesh wire screen 42 of Figure 2, or some such device. The inward fluid flow is here in opposition to the outward conduction and convection flow of heat from the heating element 16. The fluid flow inwardly absorbs heat flowing outwardly from the heating element 16 and then passes thereover towards the downstream temperature sensitive element 32 in its altered or heated state, and out the downstream opening 14 of the passage 10. The meter-connection conductors 36 and 38 register the difference in the readings of the temperature sensitive elements 30 and 32 at meter 40, enabling either a computable or directly readable rate of fluid flow.

Under the condition of a constant power application to the heating element 16, the mass rate of fluid flow is measured as a function of the temperature rise of the fluid passing over the heating element 16, as determined by the temperature sensitive elements 30 and 32 located upstream and downstream respectively of the heating element 16. Or, under conditions of variable power application to the heating element 16, the mass rate of fluid flow is determined by the power requisites of the heating element 16, readable and controllable at 22, for maintenance of a constant temperature rise of fluid passing over the heating element 16, said temperature rise being observed by means of the temperature sensitive elements readable at 40.

It is to be understood that the forms of the apparatus and possible applications of the invention herein illustrated and described in detail are not meant to limit the invention. This invention may be employed in other installations in an altered form or with variant details of arrangement without departing from the spirit of the invention or scope of the appended claims.

We claim:

1. A fluid flow meter comprising a housing having a passage formed therethrough, a heating element disposed centrally within said passage between the inlet and outlet ends thereof, a deflector plate secured across the inlet end of said passage for diverting the flow of fluid peripherally through said passage, a plurality of annular baffle plates disposed within said passage and about said heating element between said deflector plate and said outlet end of said passage, said plates diverting the peripheral flow of fluid radially inward towards said heating element and axially therethrough towards said outlet end of said passage, and temperature sensitive elements disposed within opposite ends of said fluid passage the temperature differential thereof constituting an indication of the rate of fluid flow through said passage.

2. A fluid flow meter comprising a housing having a fluid flow passage formed therethrough, a heating element disposed within said passage between the fluid inlet and outlet ends thereof, fluid baffling means secured across the inlet and outlet ends of said passage for directing the flow of fluid peripherally through said passage and centrally therefrom, and deflecting means including a plurality of annular baffle plates extending between said inlet and outlet ends and disposed about said heating element for diverting the flow of fluid from the peripheral areas of said passage inwardly towards said heating element and axially thereover through said passage, and temperature sensitive elements disposed at opposite ends of said passage within said fluid flow, the temperature differential thereof being an indication of the rate of fluid flow therethrough.

3. Means for measuring the rate of fluid flow which includes, a housing having a fluid flow passage provided therethrough, fluid heating means disposed within said passage between the fluid inlet and outlet ends thereof, means disposed at the inlet end of said fluid flow passage for diverting fluid flow peripherally into said passage, means disposed within said passage and about said heating means between the ends thereof for diverting the peripheral flow of fluid over substantially the length of said heating means radially inward towards said heating means for opposing the flow of heat radially outward therefrom, and thermal sensitive means disposed at opposite ends of said passage and responsive to the temperature of said fluid flowing therethrough.

4. In a flow meter, an elongated housing having a fluid inlet opening and a fluid discharge opening, heating means mounted in said housing in substantially axial alignment with said discharge opening, fluid deflecting means secured across said inlet opening and extending about said heating means and directing the fluid flow radially inward towards said heating means substantially throughout the length thereof in opposition to the flow of heat therefrom, said fluid deflecting means including one or more annular baffle plates surrounding said heating means and disposed substantially transversely of the normal direction of fluid flow through said housing, said fluid directed inwardly thereby being thereafter adapted to flow in the general direction of the flow of fluid through said housing and out said discharge opening, and a plurality of temperature sensitive elements axially spaced near said inlet and said outlet openings and responsive to the temperature at those points the differential of which constitutes a measure of fluid flow through said housing.

References Cited in the file of this patent

UNITED STATES PATENTS

| | | |
|---|---|---|
| 1,193,488 | Thomas | Aug. 1, 1916 |
| 1,222,492 | Thomas | Apr. 10, 1917 |
| 1,254,374 | Thomas | Jan. 22, 1918 |
| 1,313,861 | Reid et al. | Aug. 19, 1919 |
| 2,028,095 | Tully et al. | Jan. 14, 1936 |
| 2,197,818 | Tozier | Apr. 23, 1940 |
| 2,612,830 | Kendrick | Oct. 7, 1952 |